(12) United States Patent
Shao et al.

(10) Patent No.: US 12,523,768 B2
(45) Date of Patent: Jan. 13, 2026

(54) INDUSTRIAL INTERNET OF THINGS FOR REPEATED POSITIONING ACCURACY REGULATION AND CONTROL METHOD THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Bin Liu, Chengdu (CN); Yong Li, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 864 days.

(21) Appl. No.: 17/810,607

(22) Filed: Jul. 3, 2022

(65) Prior Publication Data
US 2024/0004068 A1    Jan. 4, 2024

(51) Int. Cl.
*G01S 17/06* (2006.01)
*G01S 17/88* (2006.01)
*G16Y 40/30* (2020.01)

(52) U.S. Cl.
CPC ............ *G01S 17/06* (2013.01); *G01S 17/88* (2013.01); *G16Y 40/30* (2020.01)

(58) Field of Classification Search
CPC ......... G06Q 10/0833; G06Q 10/06375; G06Q 10/087; G06Q 10/06; G06Q 50/40; G06Q 30/0201; G06Q 50/04; G06Q 30/0202; G06Q 10/08; G06Q 10/06395; G06Q 10/0635; G06Q 10/0875; G06Q 2220/00; G05B 19/4155; G05B 19/41885; G05B 2219/50391; G06N 3/08; G06N 3/09; G06N 20/00; G06N 3/0464; G06N 3/006; G06N 3/0455; G06N 20/20; G06N 3/049; G06N 7/01; G06N 3/088; G06N 3/044; G06N 5/01; G06N 20/10; G06N 3/084; G05D 1/223; G05D 1/6987; G05D 1/0297; G05D 2101/15; G05D 2107/70
See application file for complete search history.

(56) References Cited

FOREIGN PATENT DOCUMENTS

| CN | 103676976 B | 1/2016 |
|---|---|---|
| CN | 107253193 A | 10/2017 |

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Darrin D Dunn
(74) *Attorney, Agent, or Firm* — METIS IP LLC

(57) ABSTRACT

The present disclose provides an industrial Internet of things for repeated positioning accuracy regulation, comprising a user platform, a service platform, a management platform, a sensor network platform, and an object platform that interact in turn; the sensor network platform and the service platform adopt a centralized arrangement; the management platform adopts a front sub-platform arrangement. The present disclosure reduces the difficulty and error of manual calculation, reduces labor cost to further realize the rapid regulation of repeated positioning accuracy and reduce the influence on the manufacturing operation of the object platform, which is safe, efficient, and low cost.

13 Claims, 7 Drawing Sheets

(56) References Cited

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.

INDUSTRIAL INTERNET OF THINGS FOR REPEATED POSITIONING ACCURACY REGULATION AND CONTROL METHOD THEREOF

TECHNICAL FIELD

The present disclosure relates to intelligent manufacturing technology, in particular to an Industrial Internet of Things for repeated positioning accuracy regulation and a control method thereof.

BACKGROUND

An industrial robot is a multi-joint manipulator or a multi-degree-of-freedom machine device widely used in the industrial field. It has certain automaticity and can realize various industrial processing and manufacturing functions depending on its own powerful energy and control ability. The Industrial robot is widely used in various industrial fields such as electronics, logistics, chemical industry, and so on.

In intelligent manufacturing, the industrial robots are common intelligent manufacturing devices, such as moving robots, handling robots, service robots, welding robots, or the like. During the use process of the industrial robots, the industrial robots will perform by their own to complete manufacturing tasks in accordance with the procedures. However, during the long-term use of the industrial robot, due to the increase of its own wear, the reduction of its assembly degree, and the increase of the friction coefficient of the kinematic pair, the industrial robot will produce errors during its action, resulting in deviations in the position, angle, distance, and the like, which will affect the work accuracy of the industrial robots (including work accuracy, repeated positioning accuracy, and resolution). In the field of industrial robots, the extremely important work accuracy is the repeated positioning accuracy. The positioning operation in which the executing end or moving end of an industrial robot moves from different positions, in different forms, and with different speeds to the same point many times refers to the repeated positioning. The accuracy of the results of the repeated positioning operations refers to repeated positioning accuracy. When the industrial robots perform manufacturing, they often use the method of repeated positioning to realize the change of multi-point working position.

Since the repeated positioning accuracy of the industrial robots is extremely important, it is necessary to perform regular detection and correction to reduce the repeated positioning accuracy caused by error. In the prior art, industrial robots are generally provided with an error compensation table for compensating their own error, and the error compensation table generally allows users to change. In intelligent manufacturing, in order to meet the current manufacturing accuracy requirements, users need to regularly perform repeated positioning operations, and replace the error compensation table data. When performing repeated positioning operations, each industrial robot may have multiple degrees of freedom and multiple motion axes, so that there may be hundreds of compensation points, the manual operation has a huge workload, and the huge data and complex calculation process are used to assist the calculation equipment, which is still time-consuming and labor-consuming, and the artificial errors will also affect the accuracy of error compensation. In addition, the huge number of the industrial robots will bring huge time and labor cost for replacing the error data table and also affect the use of industrial robots.

In the face of many problems in the prior art, such as complex repeated positioning process, huge data, time-consuming and labor-consuming, it is urgent to find a better method to achieve faster, more accurate, and more convenient regulation of repeated positioning accuracy.

SUMMARY

The technical problem to be solved by the present disclosure is to provide an Industrial Internet of Things for repeated positioning accuracy regulation. The Internet of things may realize the rapid error detection and error compensation of the compensation point of the industrial robots, thereby achieving rapid regulation and control of the repeated positioning accuracy, which has high accuracy and fast speed and reduces the difficulty, cost, and time of repeated positioning in the pair art.

The present disclosure is realized through the following technical solutions of an Industrial Internet of Things for repeated positioning accuracy regulation comprising a user platform, a service platform, a management platform, a sensor network platform, and an object platform that interact in turn.

In some embodiments, the sensor network platform and the service platform may adopt a centralized arrangement, and the management platform may adopt a front sub-platform arrangement, wherein the centralized arrangement may refer to that the sensor network platform or the service platform uniformly receives data, uniformly processes data and uniformly sends data; and the front sub-platform arrangement may refer to the management platform being provided with a general platform and a plurality of sub-platforms, the plurality sub-platforms may store and process data of different types or different receiving objects sent by a lower-level platform, respectively, and the general platform stores and processes the data from the plurality of sub-platforms after summarizing, and transmits the data to the upper platform.

In some embodiments, the object platform may at least include an industrial robot on a production line and a repeated positioning accuracy measuring device configured for the industrial robot.

In some embodiments, when sending a repeated positioning accuracy measurement instruction, the service platform may generate a first instruction and sends the first instruction to the general platform of the management platform.

In some embodiments, the general platform of the management platform may parse the first instruction to obtain object platform information contained in the first instruction and send the object platform information corresponding to the first instruction to a sub-platform of the corresponding management platform.

In some embodiments, after receiving the first instruction, the sub-platform of the management platform may generate a measurement program package for point-by-point positioning accuracy measurement and generate a second instruction according to the measurement program package and send it to the sensor network platform.

In some embodiments, the sensor network platform may receive the second instruction and sends it to a corresponding object platform, the object platform may perform the point-by-point positioning accuracy measurement based on the second instruction to obtain a positioning error of each compensation point, and package and send it to the sensor network platform.

In some embodiments, the sensor network platform may receive the positioning error of each compensation point, generate a data packet recognized by the management platform and send it to the sub-platform of the management platform.

In some embodiments, the sub-platform of the management platform may receive the data packet, generate a group of new compensation parameters based on the positioning error of each compensation point, store them, and send them to the sensor network platform; and the sensor network platform may send the new compensation parameters to the corresponding object platform, and the industrial robot of the object platform may perform positioning compensation based on the new compensation parameters.

Preferably, after receiving the first instruction, the sub-platform of the management platform may generate the measurement program package for point-by-point positioning accuracy measurement, including follow operations.

In some embodiments, the sub-platform of the management platform pre-stores coaxial measurement point data classified according to a motion axis of the industrial robot, the coaxial measurement point data may be used to measure a positioning accuracy in a same motion axis, and each of the coaxial measurement point data includes one reference point coordinate information and a plurality of compensation point coordinate information of the industrial robot corresponding to the object platform.

In some embodiments, after receiving the first instruction, the sub-platform of the management platform may retrieve the reference point coordinate information and the plurality of compensation points coordinate information in the coaxial measurement point data, and may obtain a plurality of coordinate sets including a starting point coordinate and a ending point coordinate through taking each of the compensation point coordinate information as the starting point coordinate and taking the reference point coordinate information as the ending point coordinate.

In some embodiments, the plurality of coordinate sets of the same motion axis may be integrated, and integrated coordinate sets of the same motion axis and a plurality of coordinate sets of all motion axes may be packaged to generate the measurement program package.

Preferably, the object platform may perform point-by-point positioning accuracy measurement based on the second instruction to obtain a positioning error of each compensation point, and package and send it to the sensor network platform, including follow operations.

In some embodiments, the industrial robot may perform positioning action of the same motion axis according to the plurality of coordinate sets of the same motion axis in the second instruction after the object platform receives the second instruction, and the repeated positioning accuracy measuring device may synchronously measure and store.

In some embodiments, the actual coordinate of movement of each compensation point may be obtained, a difference between the actual coordinate of each compensation point and the coordinate of the reference point in the same motion axis may be calculated, and the corresponding difference may be taken as the positioning error of each compensation point, which may be packaged and sent to the sensor network platform.

Preferably, the sub-platform of the management platform may receive the data packet, generate a group of new compensation parameters according to the positioning error data of each compensation point, store them, and send them to the sensor network platform, and the sensor network platform may send the new compensation parameters to the corresponding object platform, and the industrial robot of the object platform may perform positioning compensation based on the new compensation parameters, including follow operations.

In some embodiments, after receiving the data packet, the sub-platform of the management platform may integrate the positioning error data of each compensation point corresponding to each compensation point to form an error compensation table and send the error compensation table to the sensor network platform as a final compensation parameter to the sensor network platform.

In some embodiments, after receiving the error compensation table, the sensor network platform may convert the error compensation table into a configuration file recognized by the industrial robot of the corresponding object platform.

In some embodiments, after receiving the configuration file, the industrial robot of the object platform may overwrite a pre-stored error compensation table in the industrial robot with the error compensation table and perform the positioning compensation according to the error compensation table.

Preferably, the Industrial Internet of Things further comprises follow operation.

In some embodiments, when the sub-platform of the management platform pre-store allowable positioning error value of each compensation point and the pre-stored error compensation table of the corresponding industrial robot, after receiving the data packet and comparing the positioning error data of each compensation point with the allowable positioning error value of each compensation point, the sub-platform of the management platform and executing follow operations.

In response to a determination that the positioning error data of the compensation point may be within the allowable positioning error value of the corresponding compensation point, it may be determined that the compensation point does not need compensation and the compensation parameters of the corresponding compensation point in the pre-stored error compensation table may be taken as the compensation parameters of the compensation point.

In response to a determination that the positioning error data of the compensation point may be not within the allowable positioning error value of the corresponding compensation point, the compensation parameters of the corresponding compensation point may be generated based on the integrated error compensation table.

Preferably, the repeated positioning accuracy measuring device may be a laser interferometer or a laser tracker.

In some embodiments, the present disclosure may also provide a control method of the Industrial Internet of Things including a user platform, a service platform, a management platform, a sensor network platform, and an object platform that interact in turn.

In some embodiments, the sensor network platform and the service platform may adopt a centralized arrangement, and the management platform may adopt the front sub-platform arrangement, wherein the centralized arrangement may refer to that the sensor network platform or the service platform uniformly receives data, uniformly processes data, and uniformly sends data; and the front sub-platform arrangement may refer to the corresponding platform being provided with a general platform and a plurality of sub-platforms, the plurality of sub-platforms may store and process data of different types or different receiving objects sent by a lower-level platform, respectively, and the general platform may store and process the data of the plurality of sub-platforms after summarizing, and transmit the data to an upper platform.

In some embodiments, the object platform may at least comprise an industrial robot on a production line and a repeated positioning accuracy measuring device configured for the industrial robot.

In some embodiments, the control method comprises follow operations.

When sending a repeated positioning accuracy measurement instruction, the service platform may generate a first instruction and send the first instruction to the general platform of the management platform.

The general platform of the management platform may parse the first instruction to obtain object platform information contained in the first instruction and send the object platform information corresponding to the first instruction to a sub-platform of the corresponding the management platform.

In some embodiments, after receiving the first instruction, the sub-platform of the management platform may generate a measurement program package for point-by-point positioning accuracy measurement and generate a second instruction based on the measurement program package and send it to the sensor network platform.

In some embodiments, the sensor network platform may receive the second instruction and send it to a corresponding object platform, the object platform may perform the point-by-point positioning accuracy measurement based on the second instruction to obtain a positioning error of each compensation point, and package and send it to the sensor network platform.

In some embodiments, the sensor network platform may receive the positioning error of each compensation point, generate a data packet recognized by the management platform and send it to the sub-platform of the management platform.

In some embodiments, the sub-platform of the management platform may receive the data packet, generate a group of new compensation parameters based on the positioning error data of each compensation point, store them, and sends them to the sensor network platform. The sensor network platform may send the new compensation parameters to the corresponding object platform, and the industrial robot of the object platform may perform positioning compensation based on the new compensation parameters.

Compared with the prior art, the beneficial effect of the present disclosure are as follows: the present disclosure may be used for industrial Internet of things for repeated positioning accuracy regulation and its control methods. The Internet of things is built based on the five platforms structure. The management platform may adopt a front sub-platform arrangement, so that the data of different object platforms may be separately processed and transmitted independently by using multiple sub-platforms, so as to ensure the effectiveness and independence of the data, reduce the mutual impact of the data of different object platform, avoid data errors, reduce the data processing demand of each sub-platform, and reduce the demand level. All data may be uniformly summarized or uniformly distributed through the general platform of the management platform, which may also ensure the coordination of all data. The sensor network platform and the service platform use a centralized arrangement, which may realize the unified regulation and processing of data, which not only facilitates the information interaction between the sensor network platform and the service platform with the object platform or user platform, but also integrates or coordinate all data, so as to ensure the operation and implementation of the overall architecture of the Internet of things.

When the present disclosure is in use, the repeated positioning accuracy measurement instructions is issued through the service platform, the service platform may uniformly send the instruction to the general platform of the management platform, and the general platform of the management platform may parse the instruction, so that the sub-platform of the management platform to which the corresponding instruction directed may issue instruction, so as to realize the classified transmission of the instruction and ensure that the object platform for executing the instruction is accurate. Therefore, the object platform corresponding to the sub-platform may perform point-by-point positioning accuracy measurement based on its compensation point, and then obtain its positioning error data, and receive the error data through the corresponding sub-platform. Through the positioning error data, new compensation parameters may be quickly generated for positioning compensation, which may not only achieve rapid and accurate error data acquisition and rapid compensation, but also ensure that the data of each object platform is processed by the corresponding sub-platform to avoid data errors. Based on this, the present disclosure reduces the difficulty and error of manual calculation and reduces the labor cost to further realize the rapid regulation of repeated positioning accuracy and reduce the impact on the manufacturing operation of the object platform, which is safe, efficient, and low cost.

BRIEF DESCRIPTION OF THE DRAWINGS

The drawings described herein are intended to provide a further understanding of the embodiments of the present disclosure, constitute a part of the present disclosure, and do not constitute a limitation of the embodiments of the present disclosure, wherein.

DETAILED DESCRIPTION

In order to make the purpose, technical scheme and advantages of the present disclosure clearer, the present disclosure is further described in detail below in combination with the embodiments and the accompanying drawings. The schematic embodiments and descriptions of the present disclosure are only used to explain the present disclosure and are not used as a limitation of the present disclosure.

Figure 1:
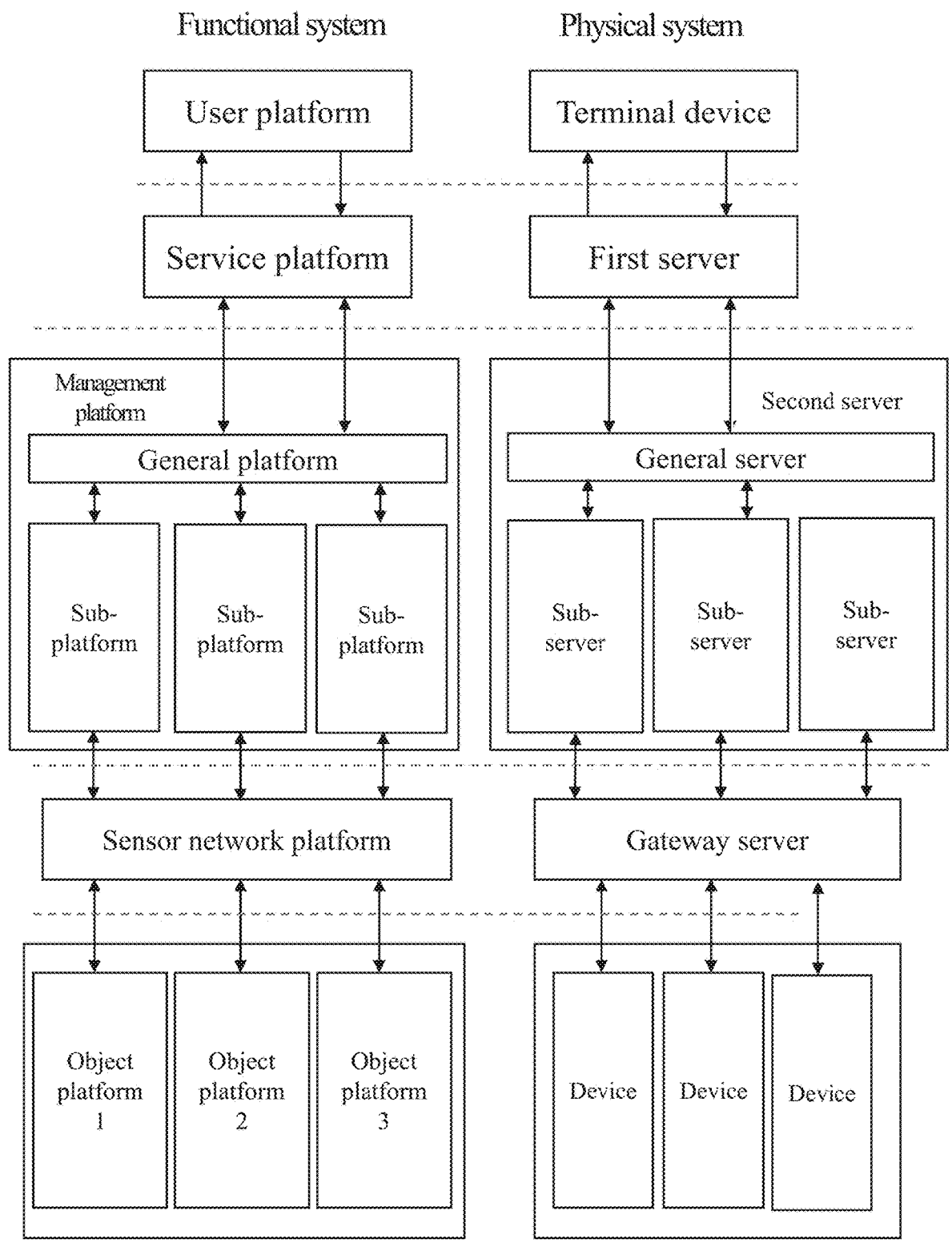
FIG. 1 is a structural frame diagram illustrating an exemplary industrial Internet of things for repeated positioning accuracy regulation according to some embodiments of the present disclosure.

As shown in FIG. 1, the first embodiment of the present disclosure provides an industrial Internet of things for repeated positioning accuracy regulation, which includes a user platform, a service platform, a management platform, a sensor network platform, and an object platform that interact in turn.

The sensor network platform and the service platform may adopt a centralized arrangement; the management platform may adopt a front sub-platform layout; the centralized arrangement may refer to that the sensor network platform or the service platform uniformly receives data, uniformly processes data, and uniformly sends data; the front sub-platform arrangement may refer to the management platform being provided with a general platform and a plurality of sub-platforms, the a plurality of sub-platforms may store and process the data of different types or different receiving objects sent by the lower-level platform, respectively, and the general platform may store and process the data of the plurality of sub-platforms after summarizing, and transmits the data to the upper platform.

The object platform may at least include an industrial robot on the production line and a repeated positioning accuracy measuring device configured for the industrial robot.

When the service platform sends a repeated positioning accuracy measurement instruction, the service platform generates a first instruction and sends it to the general platform of the management platform.

The general platform of the management platform may parse the first instruction to obtain and object platform information contained in the first instruction and send the object platform information corresponding to the first instruction to a sub-platform of the corresponding the management platform.

After receiving the first instruction, the sub-platform of the management platform may generate a measurement program package for point-by-point positioning accuracy measurement and generate a second instruction based on the measurement program package and send it to the sensor network platform.

The sensor network platform may receive the second instruction and send it to a corresponding object platform. The object platform may perform the point-by-point positioning accuracy measurement according to the second instruction to obtain a positioning error of each compensation point, and package it and send it to the sensor network platform.

The sensor network platform may receive the positioning error of each compensation point, generate a data packet recognized by the management platform, and send it to the sub-platform of the corresponding management platform.

The sub-platform of the management platform may receive the data packet, generate a group of new compensation parameters based on the positioning error data of each compensation point, store them, and send them to the sensor network platform. The sensor network platform may send the new compensation parameters to the corresponding object platform, and the industrial robot of the object platform may perform positioning compensation based on the new compensation parameters.

As an existing Internet of things architecture, the user platform may be configured as a terminal device interacting with users; the service platform may be configured as a first server for receiving the instruction of the user platform and sending the instruction to the management platform, and extracting and processing the information required by the user platform from the management platform, and sending it to the user platform; the management platform may be configured as a second server for controlling the operation of the object platform, and receiving the feedback data of the object platform; the sensor network platform may be configured as a communication network and a gateway for the interaction between the object platform and the management platform; the object platform may be configured as an industrial robot that performs manufacturing and a repeated positioning accuracy measuring device.

In the prior art, when it is necessary to regulate the repeated positioning accuracy, firstly, it may be necessary to obtain the repeated positioning error of the corresponding industrial robot, then calculate the manual error or with an auxiliary computer to obtain the error compensation table, which is imported into the industrial robot, so as to eliminate the repeated positioning error caused by long-term use. However, during the repeated positioning operation, each industrial robot may have multiple degrees of freedom and multiple motion axis, so there may be hundreds of compensation points. The workload of manual operation may be huge, and the huge data and complex calculation process are used to assist the calculation device, which may still be time-consuming and labor-consuming. The manual error may also affect the accuracy of error compensation. In addition, the huge number of industrial robots, which brings huge time and labor costs to replace the error data table, will also affect the normal use of industrial robots.

The present disclosure builds the Internet of things based on five platforms, and the management platform may adopt the front sub-platform arrangement so that the plurality of sub-platforms may be used to separately and independently process and transmit the data of different object platforms, which ensures the effectiveness and independence of the data, reduces the mutual influence of the data of different object platforms, avoids data errors, reduces the data processing demand of each sub-platform, and reduces the demand level. In addition, all data may be uniformly summarized or uniformly distributed through the general platform of the management platform, so as to ensure the coordination of all data. The sensor network platform and service platform may adopt a centralized arrangement, which may realize the unified regulation and processing of data, which not only facilitates the information interaction between the sensor network platform and service platform with the object platform or the user platform, but also integrates or coordinates all data uniformly, so as to ensure the operation and implementation of the overall architecture of the Internet of things.

When in use, the repeated positioning accuracy measurement instructions is issued through the service platform, the service platform may uniformly send the instruction to the general platform of the management platform, and the general platform of the management platform may parse the instruction, so that the sub-platform of the management platform to which the corresponding instruction directed may issue instruction, so as to realize the classified transmission of instructions and ensure that the object platform of the instruction execution is accurate. Therefore, the object platform corresponding to the sub-platform may perform point-by-point positioning accuracy measurement based on its compensation point, and then obtain its positioning error data, and receive the error data through the corresponding sub-platform. Through the positioning error data, new compensation parameters may be quickly generated for positioning compensation, which may not only achieve rapid and accurate error data acquisition and rapid compensation, but also ensure that the data of each object platform may be processed by the corresponding sub-platform to avoid data errors. Based on this, the present disclosure reduces the difficulty and error of manual calculation, reduces the labor cost, realizes the rapid regulation of repeated positioning accuracy, and reduces the impact on the manufacturing operation of the object platform, which is safe, efficient, and low cost.

It should be noted that when the industrial robot performs error detection, it detects the positioning accuracy of the execution end of the industrial robot, that is, the end that directly contacts workpiece or the end of the execution end, such as the mechanical claw of the manipulator, the clamping end of the manipulator, etc.

In some embodiments, the repeated positioning accuracy measurement instruction may also be sent by the user platform, which is accepted and processed by the service platform. After the sub-platform of the management platform receives the data packet and generates compensation parameters, the data may also be sent to the service platform through the management platform, and the user platform may view the latest data, and the user platform may retrieve the data stored by the management platform through the service platform, such as the measurement program package. These may be within the scope of authority of the user platform. Since the present disclosure does not focus on the user platform, the present disclosure only briefly describes some functions of the user platform but does not affect the integrity of the Internet of things architecture.

In some embodiments, the user platform of the present disclosure may be a desktop computer, a tablet computer, a notebook computer, a mobile phone, or another electronic device capable of data processing and data communication, which is not limited here. In specific applications, the first server and the second server may adopt a single server or a server cluster, and there are not too many limited here. It should be understood that the process of the data processing mentioned in this embodiment may be processed by the processor of the server, and the data stored in the server may be stored in the storage device of the server, such as the hard disk and other memories. In specific applications, the sensor network platform may adopt multiple groups of gateway servers or multiple groups of intelligent routers, which are not limited here. It should be understood that the process of the data processing mentioned in the embodiment of the present disclosure may be processed by the processor of the gateway server, and the data stored in the gateway server may be stored in the storage device of the gateway server, such as hard disk, SSD, and other memories.

In some embodiments, when receiving the first instruction, the sub-platform of the management platform may generate a measurement program package for point-by-point positioning accuracy measurement, specifically, which includes follow operations.

The sub-platform of the management platform pre-stores the coaxial measurement point data classified based on the motion axis of the industrial robot, and the coaxial measurement point data may be used to measure the positioning accuracy in the same motion axis; each of the coaxial measuring point data may include one reference point coordinate information and a plurality of compensation point coordinate information of the industrial robot corresponding to the object platform.

When receiving the first instruction, the sub-platform of the management platform may retrieve the coordinate information of the reference point and the coordinate information of a plurality of compensation points in the coaxial measurement point data. The sub-platform of the management platform may take the coordinate information of each compensation point as the starting point coordinate and take the coordinate information of the reference point as the ending point coordinate, so as to obtain a plurality of coordinate sets including the starting point coordinate and the ending point coordinate.

The sub-platform of the management platform may integrate the plurality of coordinate sets of the same motion axis and package the plurality of coordinate sets of all motion axes to generate the measurement program package.

It should be noted that there may be generally multiple motion axes of an industrial robot, such as an X-axis, a Y-axis, a Z-axis, etc. When the sub-platform of the management platform receives the first instruction, it first forms and integrates the coaxial measurement point data belonging to the same motion axis into a coordinate set from the starting point coordinate to the end point coordinate, the coordinate set may be the starting coordinate and ending coordinate of the motion of the execution end of the industrial robot in the motion axis. For example, the industrial robot has an X-axis, a Y-axis, and a Z-axis, when the same motion axis is the X-axis, all Y-axis values and Z-axis values of the coordinates in the axis are zero, the coordinate of the coordinate information of the compensation point is set as [200, 0, 0] and the coordinate information of the reference point is set as [120, 0, 0], then the coordinate set formed by the coordinate information of the compensation point and the coordinate information of the reference point is [200, 0, 0] →[120, 0, 0], so as to control the execution end of the industrial robot to move from the point X=200 to the point X=120 on the plane of the X-axis.

For further illustration, when in practical application, the measurement point data of the industrial robots may also be combined with the overall coordinate data of multiple motion axes, and there may be no need to distinguish according to the classification of the motion axes. For example, the industrial robot has an X-axis, a Y-axis, and a Z-axis, the coordinate of the coordinate information of compensation point is set as [200, 100, 50], the coordinate information of reference point is set as [120, 50, 100], the coordinate set formed by the coordinate information of compensation point and the coordinate information of reference point is [200, 100, 50] →[120, 50, 100], so as to control the execution end of the industrial robot to move from the points X=200, Y=100, Z=50 to the points X=120, Y=50, Z=100. Although this method may complete the repeated positioning accuracy measurement, each error involves the data of three motion axes, the difference in the movement distance of different motion axes during movement will affect the error measurement. For example, the forward and backward movement ratio of each axis in its direction may be different, which will affect the error data of the corresponding axis, resulting in the inaccurate error of the corresponding axis after measurement. Finally, it is necessary to analyze which motion axis the error belongs to. After adjusting the error of the corresponding motion axis, it may also affect the accuracy of other axes, and the calculation is complex and difficult. The present disclosure decomposes the data of each measurement point into several coaxial measurement point data according to the motion axis where it is located, so that calculation of respective motion axes may be performed during the detection and calculation.

Finally, all the error data are integrated, which may reduce the amounts of calculation and ensure the error measurement effect in each motion axis.

In some embodiments, the object platform may perform point-by-point positioning accuracy measurement based on the second instruction, obtain the positioning error of each compensation point, and package and send it to the sensor network platform, specifically, which includes follow operations.

When the object platform receives the second instruction, the industrial robot may perform the positioning action of the same motion axis according to multiple coordinate sets of the same motion axis in the second instruction, and the repeated positioning accuracy measuring device synchronously measures and stores.

The object platform may obtain the actual coordinates of movement of each compensation point, calculate the difference between the actual coordinate of each compensation point and the coordinate of the reference point in the same motion axis, take the corresponding difference as the positioning error of each compensation point, package and send it to the sensor network platform.

It should be noted that the difference between the actual coordinates of the compensation point and the coordinates of the reference point may be positive or negative. When it is negative, the symbol of the difference should be retained, and the negative difference may be used as negative compensation data. For example, if the coordinate of the coordinate information of the compensation point is [200, 0, 0], and the actual coordinate of the compensation point is [202, 0, 0], then the difference between the coordinate of the coordinate information of the compensation point and the actual coordinate of the compensation point is [2, 0, 0], and if the actual coordinate of the compensation point is [199, 0, 0], then the difference between the coordinate of the coordinate information of the compensation point and the actual coordinate of the compensation point should be [−1, 0, 0].

In some embodiments, the sub-platform of the management platform may receive the data packet, generate a group of new compensation parameters based on the positioning error data of each compensation point, store them, and send them to the sensor network platform. The sensor network platform may send the new compensation parameters to the corresponding object platform, and the industrial robot of the object platform may perform positioning compensation according to the new compensation parameters, Specifically, which includes follow operations.

When receiving the data packet, the sub-platform of the management platform may integrate the positioning error data of each compensation point corresponding to each compensation point to form an error compensation table and sends the error compensation table to the sensor network platform as the final compensation parameter.

When receiving the error compensation table, the sensor network platform may convert it into a configuration file recognized by the industrial robot of the corresponding object platform.

When receiving the configuration file, the industrial robot of the object platform may overwrite the pre-stored error compensation table in the industrial robot with the error compensation table and then perform positioning compensation according to the replaced error compensation table.

The error compensation table may be the internal program file for each industrial robot to identify error compensation. The file types of different industrial robots may be different. In view of this situation, when forming the error compensation table, the Internet of things structure uses the sub-platforms of different management platforms to form the error compensation table of the corresponding object platform, which may be written according to the allowable format or file content of the corresponding industrial robot, so that the formed error compensation table may be directly used to perform positioning compensation for the corresponding industrial robots, and a fast and efficient error compensation operation may be realized.

As a feasible method, for example, there are five compensation points a, b, c, d, and e set on the same X motion axis, and the positioning error data of the five compensation points are [2, 0, 0], [1, 0, 0], [−1, 0, 0], [−1.5, 0, 0], [1.2, 0, 0], respectively. In the formed error compensation table, the compensation values of a, b, c, d and e on the X-axis are $X=2$, $X=1$, $X=-1$, $X=-1.5$ and $X=1.2$, respectively. When there are compensation values of other motion axes for a, b, c, d, and e, the compensation values of other motion axes are filled into the corresponding compensation points a, b, c, d, and e, so as to form the error compensation table of a, b, c, d, and e in multiple motion axes. The industrial robot may perform compensation according to the compensation value in the error compensation table during execution.

In some embodiments, since it may be not necessary to reformulate the error compensation table after each repeated positioning error data measurement, some data may not need to be adjusted after measurement. In order to reduce the redundant computation, when the sub-platform of the management platform has pre-stored the allowable positioning error value of each compensation point and the pre-stored error compensation table of the corresponding industrial robot, after receiving the data packet, the sub-platform of the management platform compares the positioning error data of each compensation point with the allowable positioning error value of each compensation point and then executes operations.

In response to a determination that the positioning error data of the compensation point is within the allowable positioning error value of the corresponding compensation point, the sub-platform of the management platform may determine that the compensation point does not need compensation and take the compensation parameters of the corresponding compensation point in the pre-stored error compensation table as the compensation parameters of the compensation point.

In response to a determination that the positioning error data of the compensation point is not within the allowable positioning error value of the corresponding compensation point, the sub-platform of the management platform may generate the compensation parameters of the corresponding compensation point based on the integrated error compensation table.

In some embodiments, the repeated positioning accuracy measuring device may be a laser interferometer or a laser tracker.

Figure 2:
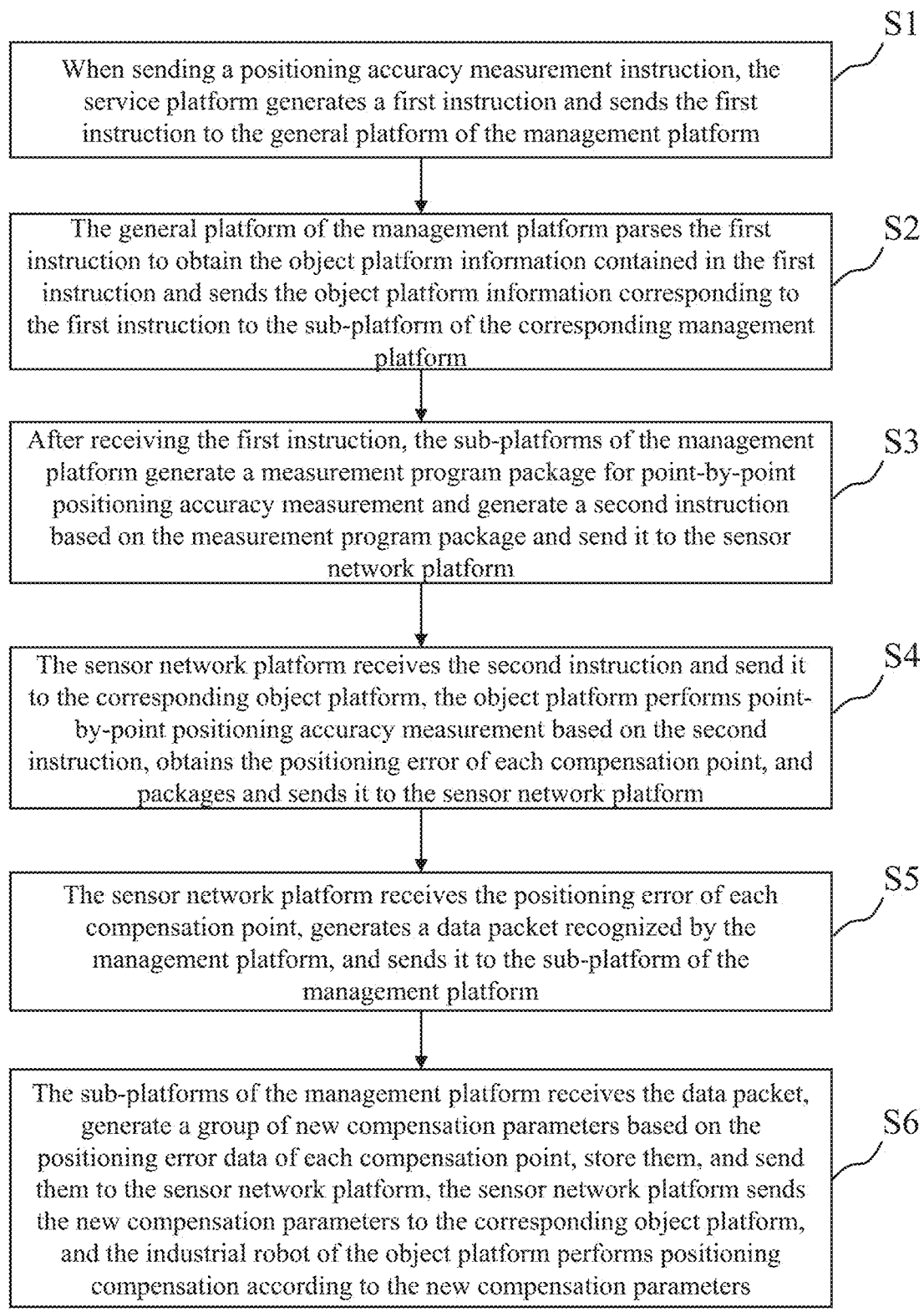
FIG. 2 is a flowchart illustrating an exemplary process for the Industrial Internet of things for repeated positioning accuracy regulation according to some embodiments of the present disclosure.

As shown in FIG. 2, the present disclosure also provides a control method of the industrial Internet of things for repeated positioning accuracy regulation based on the above industrial Internet of things for repeated positioning accuracy regulation. The control method includes follow operations.

S1: When sending a positioning accuracy measurement instruction, the service platform may generate a first instruction and send the first instruction to the general platform of the management platform.

S2: The general platform of the management platform may parse the first instruction to obtain the object platform information contained in the first instruction and send the object platform information corresponding to the first instruction to the sub-platform of the corresponding management platform.

S3: After receiving the first instruction, the sub-platform of the management platform may generate a measurement program package for point-by-point positioning accuracy measurement and generate a second instruction based on the measurement program package and send it to the sensor network platform.

S4: The sensor network platform may receive the second instruction and send it to the corresponding object platform. The object platform may perform point-by-point positioning accuracy measurement based on the second instruction, obtain the positioning error of each compensation point, and package and send it to the sensor network platform.

S5: The sensor network platform may receive the positioning error of each compensation point, generate a data packet recognized by the management platform, and send it to the sub-platform of the management platform.

S6: The sub-platform of the management platform may receive the data packet, generate a group of new compensation parameters based on the positioning error data of each compensation point, store them, and send them to the sensor network platform. The sensor network platform may send the new compensation parameters to the corresponding object platform, and the industrial robot of the object platform may perform positioning compensation according to the new compensation parameters.

Figure 3:
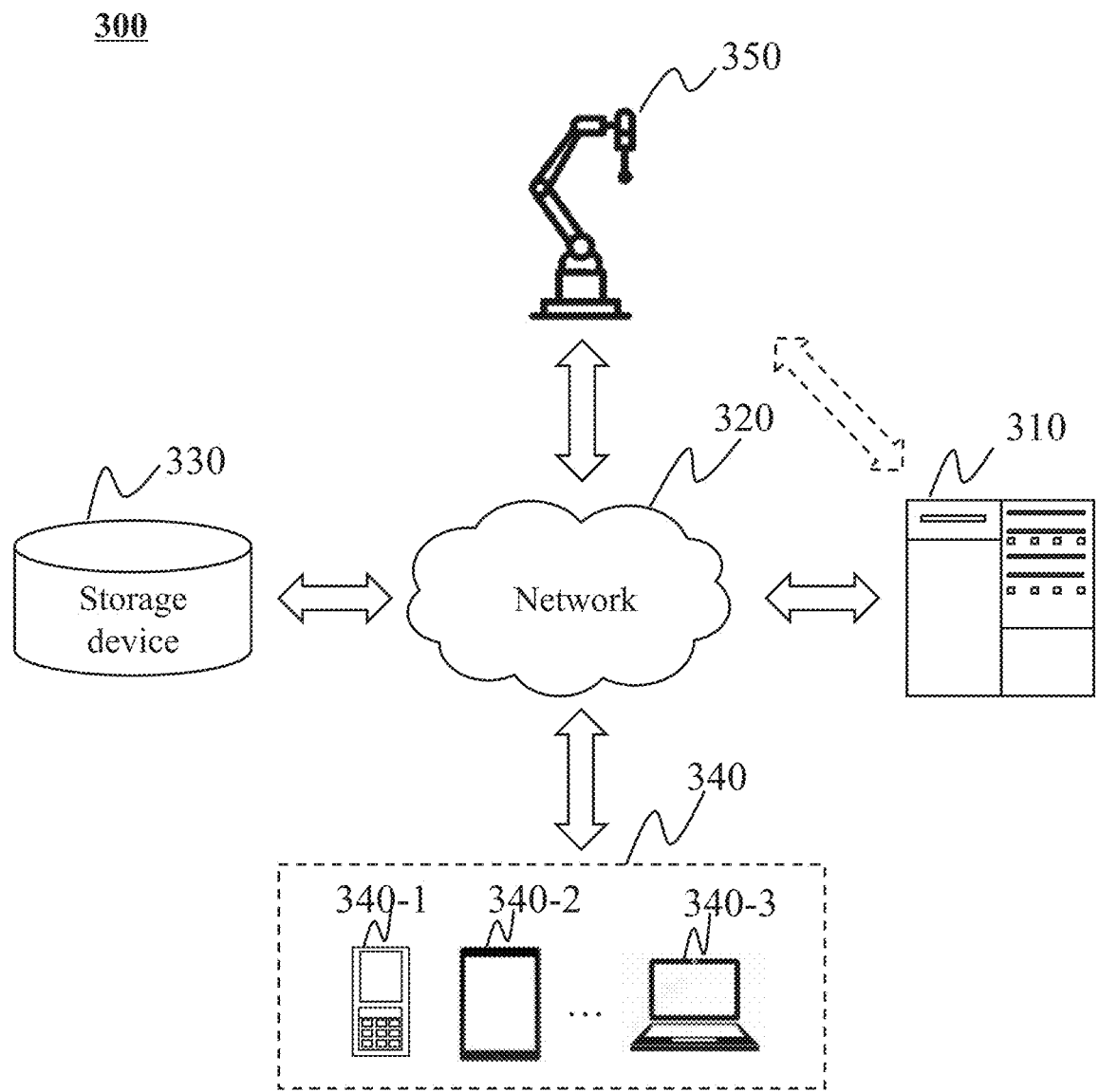
FIG. 3 is a schematic diagram illustrating an exemplary application scenario of a control method of an industrial Internet of Things for repeated positioning accuracy regulation according to some embodiments of the present disclosure.

FIG. 3 is a schematic diagram illustrating an exemplary application scenario of a control method of industrial Internet of things for repeated positioning accuracy regulation according to some embodiments of the present disclosure. As shown in FIG. 3, the application scenario 300 of the control method of the industrial Internet of things for repeated positioning accuracy regulation may include a processing device 310, a network 320, a storage device 330, a terminal device 340, and an industrial robot 350.

The processing device 310 may be connected to the terminal device 340 through the network 320, and the processing device 310 may be connected to the storage device 330 through the network 320. The processing device 310 may be configured to manage resources and also process data and/or information, and the data and/or the information may come from at least one component of the system or an external data source (e.g., a cloud data center). During running, the processing device 310 may obtain data on the storage device 330 and also save the data to the storage device 330. In some embodiments, the processing device 310 may be a single server or a group of servers. In some embodiments, the processing device 310 may be regional or remote. In some embodiments, the processing device 310 may be implemented on a cloud platform or provided in a virtual manner.

In some embodiments, the processing device 310 may include a processor. The processor may process data and/or information obtained from other devices or system components. The processor may execute program instructions based on these data, information, and/or processing results to perform one or more of the functions described in the present disclosure. In some embodiments, the processing device may comprise one or more sub-processing devices (e.g., a single-core processing device or a multi-core processing device). As an example, the processing device may include a Central Processing Unit (CPU), an Application Specific Integrated Circuit (ASIC), or the like, or any combination thereof.

The processing device 310 may be configured to process information and/or data related to the application scenario 300, such as industrial robot device information, motion information, positioning information, or the like. The processing device 310 may process data, information, and/or processing results obtained from other devices or system components, and execute program instructions based on these data, information, and/or processing results to perform one or more functions described in the present disclosure. For example, the processing device 310 may process the operation information received by the intelligent terminal 340. In some embodiments, the processing device 310 may be configured for platform maintenance and management work of the management platform.

In some embodiments, the positioning error of the industrial robot 350 may be determined after processing by the processing device 310. In some embodiments, the processing device 310 may run a prediction model to predict the positioning error of the industrial robot through the prediction model.

The network 320 may connect various components of the application scenario 300 and/or connect the system with external resources. The network 320 enables the communication between components, as well as with other components outside the system, to facilitate the exchange of data and/or information. In some embodiments, the network 320 may be any one or more of wired network or wireless network. For example, the network 320 may include a cable network, an optical fiber network, or the like, or any combination thereof. The network connection between each component may adopt one of the above methods or multiple methods. In some embodiments, the network may be a variety of topologies such as point-to-point, shared, central, or a combination of a variety of topologies. In some embodiments, the network 320 may include one or more network access points. In some embodiments, data related to the positioning error of the industrial robot 350 may be transmitted through the network 320.

The storage device 330 may be configured to store data and/or instructions. In some embodiments, the storage device 330 may store data and/or instructions for execution or usage by the processing device 310 to complete the exemplary methods described in the present disclosure. In some embodiments, the storage device 330 may be connected to the network 320 to communicate with one or more components of application scenario 300 (e.g., the processing device 310, the terminal device 340).

The terminal device 340 may connect and/or communicate with the processing device 310, the storage device 330, and/or the industrial robot 350. For example, the terminal device 340 may obtain and display device information, motion information, positioning information, or the like, of the industrial robot 350 from the storage device 330, so that the user may understand the working condition and positioning error of the industrial robot. In some embodiments, the terminal device 340 may include a mobile device 340-1, a tablet computer 340-2, a notebook computer 340-3, or any combination thereof. In some embodiments, the terminal device 340 (all or part of its functions) may be integrated into the processing device 310.

The industrial robot 350 may be a multi-joint manipulator or a multi-degree-of-freedom robot facing the industrial field. In some embodiments, the industrial robot 350 may be a mechanical device that automatically performs work and a machine that realizes various functions by its own power and control capability. The industrial robot 350 may include a plurality of sub-systems, such as a mechanical structure system, a driving system, a sensing system, a robot-environment interaction system, a human-computer interaction system, a control system, etc.

The positioning error of industrial robot 350 will be caused by the characteristics of servomechanism, gap and rigidity of feed system, and friction characteristics, etc. In some embodiments, the positioning error of the industrial robot 350 may be represented by the repeated positioning accuracy.

Figure 4:
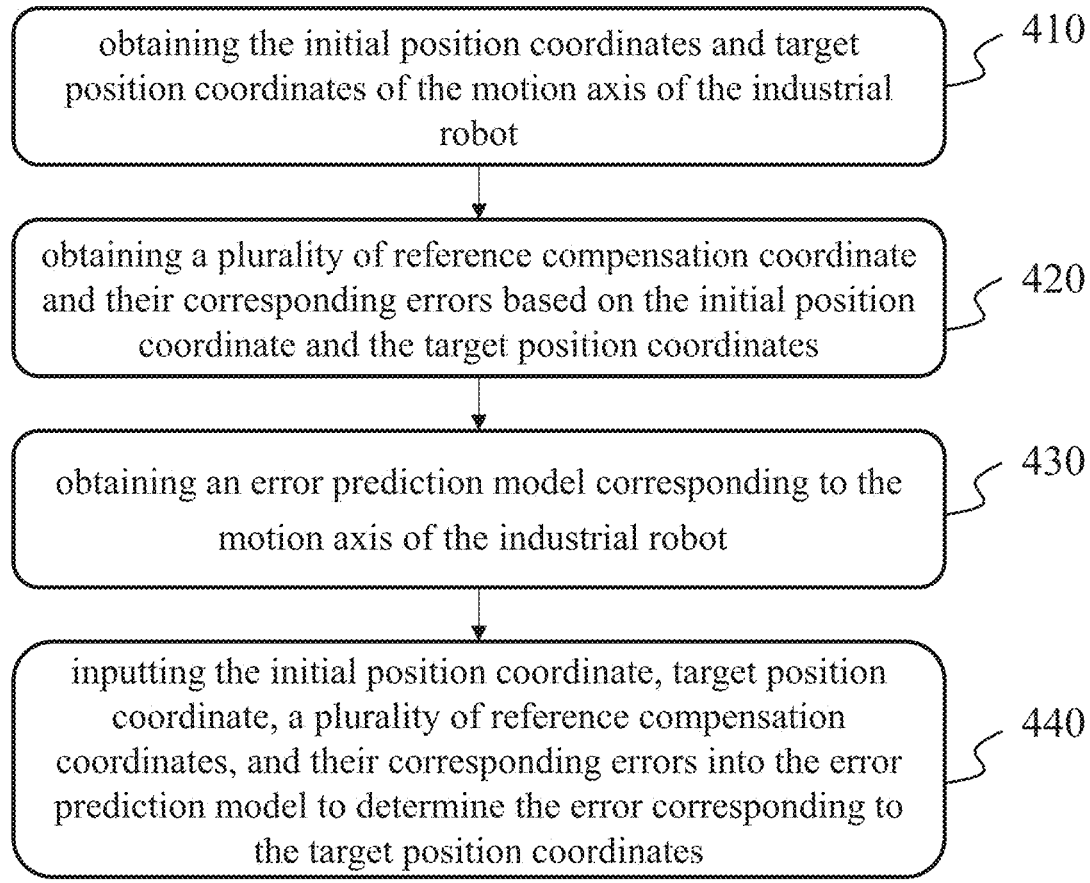
FIG. 4 is a flowchart illustrating an exemplary process of a method for determining a positioning error according to some embodiments of the present disclosure.

FIG. 4 is a flowchart illustrating an exemplary process for determining the positioning errors according to some embodiments of the present disclosure. As shown in FIG. 4, the method 400 includes the following steps. In some embodiments, the method 400 may be executed by an industrial Internet of things system for repeated positioning accuracy regulation, for example, the method 400 may be executed by sub-platforms of the management platform.

In step 410, obtaining the initial position coordinate and target position coordinate of the motion axis of the industrial robot.

The motion axis of the industrial robot may refer to the axis position direction of the motion axis of the industrial robot, such as the X-axis, Y-axis, or Z-axis.

The initial position coordinate of the motion axis of the industrial robot may refer to the coordinate information of the initial position before the motion axis of the industrial robot moves. The target position coordinates of the motion axis of the industrial robot may refer to the coordinate information of the target position that the motion axis of the industrial robot is required to reach. For example, based on movement instruction, the motion axis of the industrial robot is required to start from point A ($x_a$, $y_a$, $z_a$) to point B0 ($x_{b0}$, $y_{b0}$, $z_{b0}$), then the point A is the initial point, and its coordinate ($x_a$, $y_a$, $z_a$) is the initial position coordinate, the point B0 is the target point, and its coordinate ($x_{b0}$, $y_{b0}$, $z_{b0}$) is the target position coordinate.

In some embodiments, due to the movement error of the motion axis of the industrial robot, when the motion axis of the industrial robot executes the movement instruction from point A to point B0, it may actually reach to point B, and the coordinate difference between point B0 and point B may be taken as the movement error of the motion axis of the industrial robot. If it is necessary to realize the accurate control of the motion axis of the industrial robot, the error needs to be determined in advance. For more descriptions about how to determine the errors, please refer to other parts of the present disclosure.

In some embodiments, the sub-platform of the management platform may obtain the initial position coordinate of the motion axis of the industrial robot from the object platform through the sensor network platform. In some embodiments, the sub-platform of the management platform may obtain the target position coordinate based on the instructions (e.g., the movement instructions) sent by the general platform.

In step 420, obtaining a plurality of reference compensation coordinates and their corresponding errors based on the initial position coordinate and the target position coordinate.

The reference compensation coordinates may refer to the coordinates of the reference compensation point. In some embodiments, the reference compensation point may refer to a target point with known movement error, such as the compensation point with the measured positioning error described above. For example, the point G0 ($x_{G0}$, $y_{G0}$, $z_{G0}$) is the reference compensation coordinate related to the initial point A, and the error corresponding to point G0 (i.e., the movement error corresponding to point G0) is known to be ($x_{G0}$-$x_G$, $y_{G0}$-$y_G$, $z_{G0}$-$z_G$), where the coordinate ($x_G$, $y_G$, $z_G$) is the position to which the motion axis of the industrial robot actually moves when executing the movement instruction from point A to point G0.

In some embodiments, when the motion axis of the industrial robot moves from an initial point to several different target points, the actual position point to which the motion axis of the industrial robot actually moves may be measured in advance, and the coordinate difference between each target point and its corresponding actual position point may be taken as the error corresponding to the reference compensation point related to the initial point. Then such target points (the target points that have measured errors in advance) may be used as the reference compensation points related to the corresponding initial points (or referred to as the reference compensation coordinates related to the corresponding initial position coordinates), and their coordinates are the reference compensation coordinates.

In some embodiments, the information of several reference compensation points corresponding to each initial position coordinate may be recorded and saved in advance, for example, the coordinates of the initial point corresponding to each reference compensation point (i.e., the initial position coordinates), the coordinates of each reference compensation point (i.e., the reference compensation coordinates), and the error corresponding to the reference compensation point (i.e., the positioning error) may be saved. After the initial position coordinates and target position coordinates are obtained, the reference compensation coordinates corresponding to the initial position coordinates and their corresponding to errors may be determined by looking up the table.

In some embodiments, when determining the reference compensation coordinates, the determined reference compensation coordinates also need to meet some preset requirements. Please refer to FIG. 5 and related contents for more descriptions.

In step 430, obtaining an error prediction model corresponding to the motion axis of the industrial robot.

The error prediction model may be configured to predict the error of target position. In some embodiments, different motion axes of the industrial robot may correspond to different error prediction models, that is, each sub-platform of the management platform may establish the error prediction model of the corresponding motion axis of the industrial robot.

In some embodiments, the sub-platform of the management platform may obtain the error prediction model corresponding to the motion axis of the industrial robot from its own memory. In some embodiments, the error prediction model may be a machine learning model or a neural network model, and the error prediction model may also be implemented in other ways, without limitation here. In some embodiments, the error prediction model may include, but is not limited to, a Convolutional Neural Network (CNN) model, a Recurrent Neural Network (RNN) model, or the like. In some embodiments, the error prediction model may be obtained by training.

In step 440, inputting the initial position coordinate, target position coordinate, a plurality of reference compensation coordinates and their corresponding errors into the error prediction model to determine the error corresponding to the target position coordinates.

The "error" in the error corresponding to the target position coordinate may refer to the difference between the target position coordinates preset by the instruction and the actual position coordinates that may be actually reached. Since the error corresponds to the reference compensation point that starts to move based on the same initial position coordinates may be used as a reference for the error corresponding to the target position coordinates. Therefore, the sub-platforms of the management platform may predict the corresponding errors of the target position coordinates by establishing an error prediction model corresponding to the motion axis of the industrial robot, and inputting the initial position coordinates, the target position coordinates, and multiple reference compensation coordinates and their corresponding errors into the error prediction model, so as to realize the adjustment of the operating parameters or states of the motion axis of the industrial robot based on the error, and achieve the precise motion of the motion axis of the industrial robot as much as possible.

In some embodiments, the sub-platform of the management platform may input the initial position coordinates, target position coordinates, multiple reference compensation coordinates and their corresponding errors into the error prediction model, and the error prediction model may output the errors corresponding to the target position coordinates. In some embodiments, the sub-platform of the management platform may determine the compensation value according to the error corresponding to the predicted target position coordinates, so that the motion axis of the industrial robot may move to the target position. In some embodiments, the sub-platform of the management platform may send the compensation value to the corresponding object platform through the sensor network platform, and the motion axis of the industrial robot of the object platform may perform positioning compensation according to the compensation value. In some embodiments, the compensation value may be adapted to the error corresponding to the target position coordinates. For example, the compensation value may be equal to the error corresponding to the target position coordinates. For example, the compensation value may be opposite to the error corresponding to the target position coordinates. For more information about the error prediction model, please refer to FIG. 6 and related contents.

Through the error prediction model to predict the error corresponding to the target position coordinates, the operating parameters or states of the motion axis of the industrial robot may be adjusted based on the error, so as to achieve the purpose of controlling the precise movement of the motion axis of the industrial robot.

Figure 5:
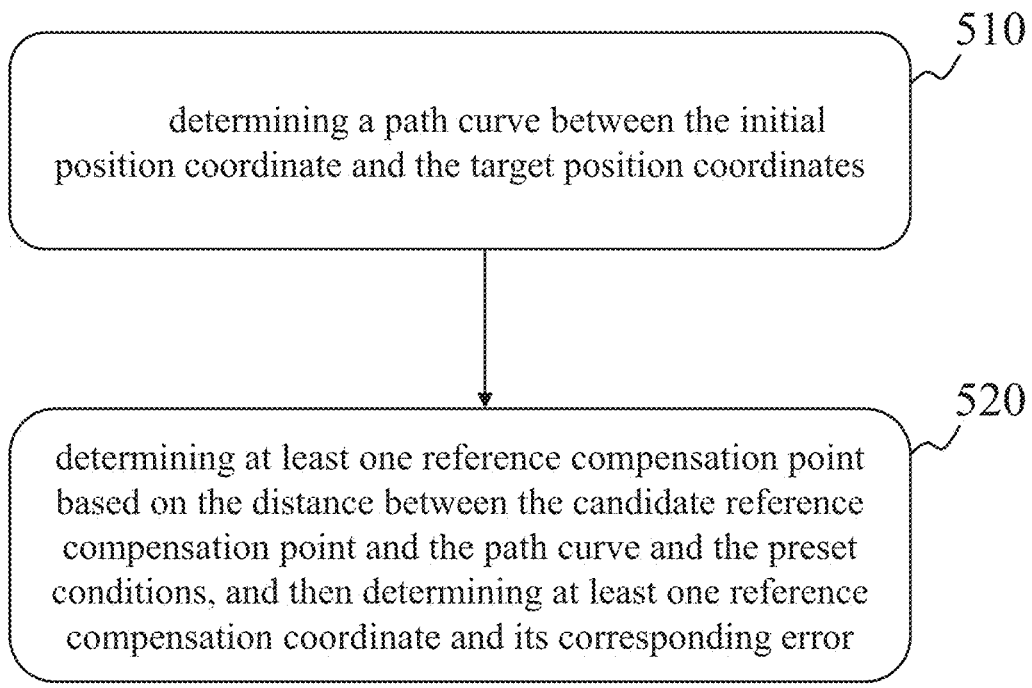
FIG. 5 is a flowchart illustrating an exemplary process for obtaining a plurality of reference compensation coordinates according to some embodiments of the present disclosure.

FIG. 5 is a flowchart illustrating an exemplary process for obtaining a plurality of reference compensation coordinates according to some embodiments of the present disclosure. In some embodiments, the method 500 may be accomplished by the processing device 310. As shown in FIG. 5, the method 500 may include the following steps.

In step 510, determining a path curve between the initial position coordinates and the target position coordinates.

The path curve may refer to the curvilinear track of the end of the manipulator of the motion axis of the industrial robot. In some embodiments, the path curve may also be a curve contour of the displacement, velocity, and acceleration of the manipulator of the motion axis of the industrial robot during moving. In some embodiments, the starting point coordinate of the path curve may be the initial position coordinates, and the ending point coordinate of the path curve may be the target position coordinates. In some embodiments, the path curve may be a straight line, that is, the end of the manipulator of the motion axis of the industrial robot moves to the target position in a straight line. In some embodiments, the path curve may also be a curve. In some embodiments, the path curve may be represented in a coordinate system based on a line of multiple coordinate points.

In some embodiments, the path curve may be determined based on a variety of ways, for example, the path curve may be determined by an object platform or a path curve measuring device external to the industrial robot. The path curve measuring device may include machine vision, laser radar, and other high-precision measuring systems. For another example, the path curve may be determined by one or more high-precision sensors on the manipulator of the motion axis of the industrial robot. The high-precision sensor on the manipulator of the motion axis of the industrial robot may be an acceleration sensor. For another example, the path curve may also be jointly determined by the internal sensors and external measuring devices of the industrial robot.

In step 520, determining at least one reference compensation point based on the distance between the candidate reference compensation point and the path curve and the preset conditions, and then determining at least one reference compensation coordinate and its corresponding error.

The candidate reference compensation point may be a reference compensation point around the target point that may be used to predict the error of the target point.

In some embodiments, reference compensation points for determining the reference compensation coordinates may be selected from the candidate reference compensation points based on whether the distance between the candidate reference compensation point and the path curve meets the preset conditions.

In some embodiments, the preset condition may be that the distance between the candidate reference compensation point and the path curve does not exceed the preset distance value, or that the distance between the candidate reference compensation point and the path curve is the smallest, or that the distance between the candidate reference compensation point and the target position coordinates does not exceed the distance threshold. The distance between the candidate reference compensation point and the path curve refers to the distance corresponding to the shortest path of a candidate reference compensation point to the path curve in a three-dimensional coordinate system. In some embodiments, the distance between the candidate reference compensation point and the path curve may be determined by a mathematical method, numerical analysis, or the like (e.g., Euclidean geometry or Manhattan distance). In some embodiments, the distance between the candidate reference compensation point and the path curve may be determined by the processing device 310.

In some embodiments, at least one reference compensation point may be determined based on the distance between the candidate reference compensation point and the path curve and a preset condition. In some embodiments, a plurality of candidate reference compensation points has a plurality of distances corresponding to the path curve. In some embodiments, at least one reference compensation point may be determined according to the plurality of distances. In some embodiments, the preset condition may also include that the number of reference compensation points is not more than or less than a set number. In some embodiments, N candidate reference compensation points with the smallest distance may be determined as reference compensation points, and N is a positive integer greater than or equal to 1. In some embodiments, the candidate reference compensation point with the shortest distance from the path curve may be determined as the reference compensation point.

In some embodiments, the corresponding reference compensation coordinates may be determined based on the determined reference compensation points. The reference compensation coordinate may refer to the coordinate of the selected reference compensation point.

In some embodiments, the error corresponding to the reference compensation coordinate may be determined based on the reference compensation coordinate, and the initial position coordinate corresponding to the error corresponding to the reference compensation coordinate may be the starting point coordinate of the path curve. The error corresponding to the reference compensation coordinate may be related to the initial position coordinate. If the initial position coordinates are different, the error corresponding to moving to the same reference compensation coordinate may also be different. The closer the point is, the closer the error law is. In some embodiments, the error law of the reference compensation point closer to the target point may be closer to the error law of the target point. Moreover, the error law of the reference compensation point closer to the path curve may be closer to the error law of the target point. Therefore, when there are multiple reference compensation points with the same distance from the path curve and it is necessary to select form the multiple reference compensation points, the reference compensation point that is closer to the target point may be selected.

The moving error of the motion axis of the industrial robot has an internal law, and the error law of the point of the same initial position coordinates or closer the path curve may be closer. Therefore, using the point closer to the path curve as the reference compensation point may better predict the positioning error of the target point.

The target position coordinate may refer to the coordinate of the target point that needs to measure the positioning error. In some embodiments, the target position coordinates may be determined, and the positioning error of the motion axis of the industrial robot at the target position may be determined based on the reference compensation coordinates. In some embodiments, when the preset condition is that the distance between the reference compensation coordinate and the path curve does not exceed the preset distance value, or the preset condition is that the distance between the reference compensation coordinate and the target position coordinate does not exceed the distance threshold, if predicting the error of a target position coordinates needs to be combined with R reference compensation coordinates, then the coordinates of the R reference compensation points whose distance (such as the distance from R reference compensation coordinates to the path curve or the distance from R reference compensation coordinates to the target position coordinates) meets the preset conditions may be taken as the R reference compensation coordinates.

In some embodiments, the preset distance value included in the preset conditions may be adjusted. The smaller the preset distance value is, the greater the reference of the error corresponding to the reference compensation coordinate to the prediction of the target position coordinate is. After the preset distance value is adjusted, the number of reference compensation points that meet the preset conditions may also change correspondingly. For example, after the preset distance value is reduced, the number of the reference compensation points that meet the preset conditions is B, and B<R. At this time, the insufficient R-B reference compensation coordinates may be supplemented by the initial position coordinates and errors, and the error corresponding to the initial position coordinates is 0.

In some embodiments, for the reference compensation points that meet the preset conditions, part of the reference compensation points may also be selected to predict the positioning error of the target point. For example, it may be preset that the number of reference compensation points used to predict the positioning error of the target point is b. In some embodiments, the values of R and b may be preset. As an example only, to predict the error of a target position coordinate, it may be necessary to combine 10 reference compensation coordinates, i.e. R=10, and 5 reference compensation coordinates whose distance meets the preset conditions are set, i.e. b=5, there are 6 reference compensation coordinates whose distance meets the preset conditions, i.e. B=6, then 5 nearest reference compensation coordinates are selected, and the remaining 5 reference compensation coordinates may be supplemented with the initial position coordinates, and the errors corresponding to the initial position coordinates are all 0.

In some embodiments, the selected b reference compensation coordinates may also be used to supplement the remaining R-b coordinates. For example, in the above example, the selected 5 reference compensation coordinates and their corresponding errors may also be reused to supplement the remaining 5 reference compensation coordinates and their corresponding errors. In some embodiments, one nearest reference compensation coordinate may be used to repeatedly supplement other R-b coordinates. In the above example, if the distance between the reference compensation coordinate M and the path curve or the distance between the reference compensation coordinate M and the target position coordinate is nearest, the reference compensation coordinate M and its corresponding errors may be reused to supplement the remaining 5 reference compensation coordinates and their corresponding errors.

Figure 6:
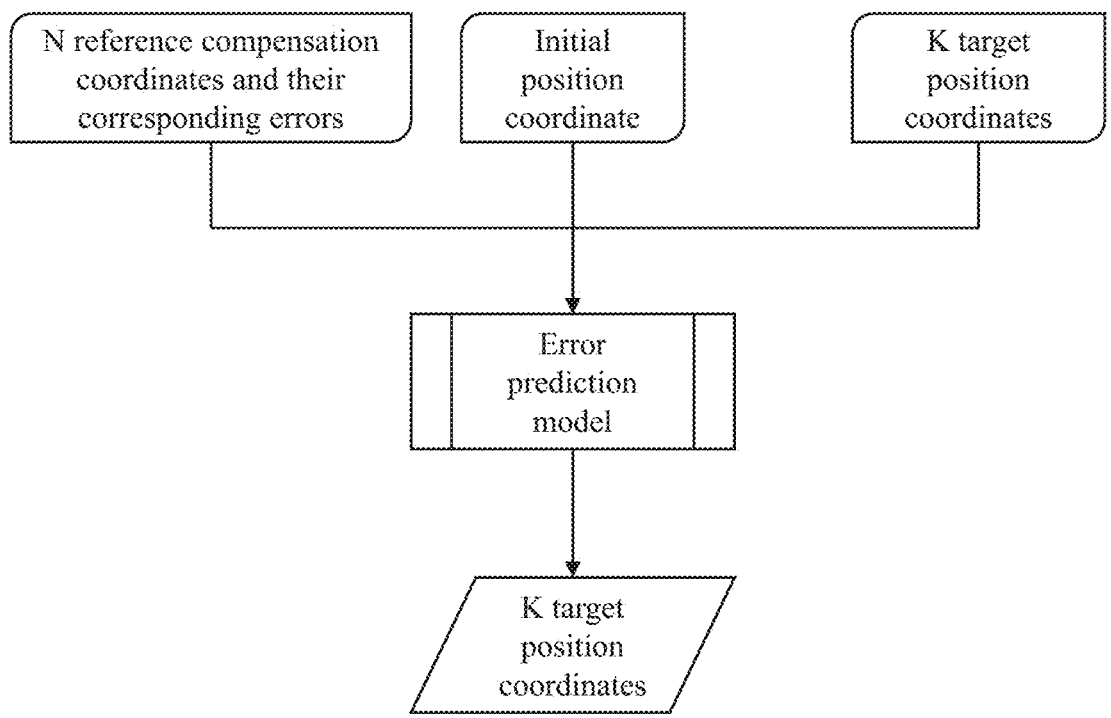
FIG. 6 is a schematic diagram illustrating an exemplary error prediction model according to some embodiments of the present disclosure.

For more information about how to determine the value of R and b, please refer to FIG. 6.

By setting the threshold value, the number of selected reference compensation points may be determined more flexibly, so that the selection of the number of reference compensation points may be more reasonable.

FIG. 6 is a schematic diagram of an exemplary error prediction model according to some embodiments of the present disclosure. As shown in FIG. 6, N reference compensation coordinates and their corresponding errors, initial position coordinates, and K target position coordinates may be used as inputs of the error prediction model 600, and the error prediction model 600 outputs the errors of K target position coordinates.

Since the initial position coordinates corresponding to the reference compensation point and the target position coordinates may be the same, the errors of the motion axis of the industrial robot moving from the same initial position coordinates to the reference compensation coordinates and the target position coordinates may have a certain internal correlation, so that the reference compensation coordinates and their corresponding errors may be input into the error prediction model 600, and the error prediction model 600 may be output the error of the target position coordinates based on the initial position coordinates and the target position coordinates, so as to achieve the purpose of error prediction. It should be noted that N and K may be fixed values, and their values may be related to the category and type of the motion axis of the industrial robot. For example, the values of N and K of the motion axis of the same industrial robot may be the same.

In some embodiments, predicting the error of one target position coordinate needs to be combined with R reference compensation coordinates and their corresponding errors. Therefore, to predict the error of K target position coordinates, K×R reference compensation coordinates may be required, i.e., N=K×R. In some embodiments, predicting the error of a target position coordinate needs to combine b reference compensation coordinates and their corresponding errors whose distance (the distance between the reference compensation point and the path curve) may be less than the threshold value, and N reference compensation coordinates and their corresponding errors may include K×b reference compensation coordinates and their corresponding errors and K×(R−b) virtual reference compensation coordinates and their corresponding errors.

The virtual reference compensation coordinates may be supplemented by the initial position coordinates. Since there may be no error from the initial position to the initial position, the initial position coordinate and its corresponding error may be 0, that is, the error corresponding to the virtual reference compensation coordinate input into the error prediction model may be 0. For the contents about using the initial position coordinate as the virtual reference compensation coordinate to supplement the reference compensation coordinate and its corresponding error, please refer to the above FIG. 5 and its related descriptions. The values of R and b may be determined as described below.

In some embodiments, if the number of target position coordinates requiring prediction error is less than K, the reference compensation coordinates with the known error may be used as the target position coordinates of the prediction error to supplement the number of target position coordinates input into the error prediction model. For example, if it is required to predict errors of the motion axis I of the industrial robot moving from point A to five target points, and the K value of the error prediction model corresponding to the motion axis I of the industrial robot is 6, one of the determined reference compensation coordinates may be selected as the target position coordinate, which is used as the input of the error prediction model together with the other five target position coordinates that actually need to predict error.

In some embodiments, a preset rule may be added inside the error prediction model, so that when the input target position coordinate includes reference compensation coordinates, the error prediction model directly outputs the error corresponding to the reference compensation coordinate. For example, a preprocessing layer may be set in the input layer of the error prediction model, i.e., before entering the actual neural network calculation layer. The preprocessing layer may identify which of the input target position coordinates are the reference compensation coordinates with the measured error. For the reference compensation coordinates with the measured error, the reference compensation coordinates may be no longer input into the neural network calculation layer for internal calculation, but directly output the error to the output layer.

In some embodiments, the preprocessing layer may judge the reference compensation coordinates contained in the input target position coordinates based on a variety of ways. For example, the preprocessing layer may judge the reference compensation coordinates contained in the target position coordinates by looking up a data table for storing the reference compensation coordinates corresponding to all initial points added to the error prediction model.

In some embodiments, the value of R may be determined in advance based on the prediction accuracy of the error prediction model for the error corresponding to the target position coordinates.

The prediction accuracy may refer to the difference between the error predicted by the error prediction model and the actual error. The actual error may refer to the actual difference between the target position coordinates and the actual position coordinates. The smaller the difference between the predicted error and the actual error is, the higher the prediction accuracy is. In some embodiments, the actual error may be measured manually, and the difference between the actual error and the prediction error may be calculated to determine the prediction accuracy of the error output from the error prediction model, for example, the smaller the difference is, the higher the prediction accuracy is.

In some embodiments, the greater the value of R is, the greater the correction effect of more reference compensation coordinates and their corresponding errors on the prediction of the error prediction model is. Accordingly, the higher the prediction accuracy of the error prediction model on the error corresponding to the target position coordinates is. However, the greater the value of R is, the greater the calculation amount of the model is, and the lower the calculation speed is. Therefore, it is necessary to minimize the value of R on the premise of ensuring the prediction accuracy of the error prediction model.

In some embodiments, whether the current value of R is reasonable may be determined in combination with whether the prediction accuracy of the error prediction model for the error corresponding to the target position coordinate meets the preset requirements under the corresponding value of R. For example, when the value of R is 6, if the prediction accuracy of the error prediction model for the error corresponding to the target position coordinates is lower than the preset value, it may be necessary to increase the value of R. For another example, if the value of R is 6 or above, the prediction accuracy may be higher than the preset value, so in order to avoid the problem of overfitting the error prediction model and then avoid the length of the calculation process of the error prediction model, the value of R may be 6.

The number of reference compensation points is determined based on the prediction accuracy of the error prediction model for the error corresponding to the target position coordinates, which may make the selection of the number of reference compensation points more reasonable. On the premise of ensuring that the prediction accuracy of the error prediction model meets the requirements, the calculation process of the error prediction model may be reduced as much as possible to avoid the problem of overfitting the error prediction model.

In some embodiments, the value of b may be dynamically determined. In some embodiments, the value of b may change in the same direction according to the change of the value of R. For example, when R increases, b may increase. In some embodiments, the value of b may be determined according to the prediction accuracy of the error corresponding to the target position coordinates by the error prediction model. The method of determining the value b according to the prediction accuracy may be similar to that of R, so as to reduce the storage of the reference compensation coordinate and its corresponding error, reduce the measurement pressure of the error corresponding to the reference compensation coordinate, and ensure the prediction accuracy, that is, the value of b may be minimized on the premise of ensuring the prediction accuracy.

The training of the error prediction model 600 may be described below.

In some embodiments, the error prediction model may be trained by a plurality of labeled training samples. For example, multiple labeled training samples may input the initial error prediction model, and a loss function may be constructed through the label and the results of the initial error prediction model, and the parameters of the initial error prediction model may be iteratively updated based on the loss function. When the loss function of the initial error prediction model meets the preset conditions, the model training may be completed, and the trained error prediction model may be obtained. The preset conditions may be the convergence of the loss function, the number of iterations reaching the threshold, etc.

In some embodiments, the training samples of the error prediction model 600 may include N reference compensation coordinates and their corresponding errors, initial position coordinates, and K target position coordinates.

In some embodiments, the acquisition method of training samples may be as follows: P points (P≥N, P≥K) in the motion area of the motion axis of the industrial robot are arbitrarily set, the errors of the motion axis of the industrial robot from the initial position to each point according to the instructions are recorded respectively. The coordinates of each point and its corresponding errors form a training data, any N points from the P points are taken as the reference compensation points, and any K points from the P points are taken as the target position points. The corresponding errors of the N points from the training data are obtained. The coordinates of the N points and their corresponding errors, and the coordinates of the K target position points and the initial position coordinates may be the training samples. In some embodiments, N and K may be repeatedly taken in different ways in P points, so as to obtain more different training samples, and then achieve the purpose of obtaining more training samples based on a small amount of training data.

In some embodiments, the label of the training sample may be errors corresponding to the coordinates of K target position points. In some embodiments, the errors of K target position coordinates may be obtained from the above training data. For example, 100 points arbitrarily in the motion area of the motion axis of the industrial robot are set, and the error of the motion axis of the industrial robot from the initial position to the 100 points as according to instruction are recorded respectively. The coordinates of the 100 points and their corresponding errors form the training data. Each training may take any 50 points from the 100 points as the reference compensation points and any 20 points as the target position points. The corresponding errors of the 50 reference compensation points are obtained from the training data. The coordinates and corresponding errors of the 50 reference compensation points, the coordinates of the 20 target position points, and the initial position coordinates may be the training samples, and the labels of the training samples may be the corresponding errors of the 20 target position points.

In some embodiments, the range of P points arbitrarily set in the motion area of the motion axis of the industrial robot needs to cover the moving area of the motion axis of the industrial robot (the area that the motion axis of the industrial robot may reach) as much as possible, so that the range of the reference compensation points selected from the P points may cover the moving area of the motion axis of the industrial robot as much as possible. In some embodiments, there may be at least C reference compensation points around each target position (within the range of distance less than the threshold) selected from the P points. The value of C may be determined based on experience or the training effect of the error prediction model.

In some embodiments, the loss function involved in the training of the error prediction model 600 includes a plurality of loss terms, for example, the loss function includes K loss terms. Each loss item corresponds to the output error loss of one target position.

In some embodiments, the loss function used for training the model may be the sum of the weights of a plurality of loss items, that is, the loss function may be the sum of the products of each loss item and its reference weight. The reference weight may refer to the relative importance of the error loss of the target position represented by the loss term in the whole loss function.

In some embodiments, if J target position coordinates of the K target position coordinates may need to be actual predicted error, and K-J target position coordinates is supplemented by the reference compensation coordinates, the reference weight of the K-J loss items corresponding to the K-J target position coordinates supplemented by the reference compensation coordinates may be 0.

In some embodiments, for the j target position coordinates needing to be actual predicted error, the reference weights of the corresponding J loss terms may be negatively related to the sum of the distances between the selected reference compensation points and the path curve. The sum of the distance between each reference compensation point and the path curve may be the sum of the distance from each selected reference compensation point respectively to the path curve. The path curve may be the connecting line between the initial position coordinates and the target position coordinates. For more information about the path curve and the distance between the reference compensation point and the path curve, please refer to FIG. 5 and its relevant descriptions.

For example, K=5, J=3, the loss function is:

$$LOSS = w1*h1 + w2*h2 + w3*h3 + w4*h4 + w5*h5,$$

where h1, h2, h3, h4, and h5 are error losses of the output target position, the target position coordinates corresponding to h4 and h5 may be supplemented by the reference compensation coordinates, and w1, w2, w3, w4, and w5 may be the reference weights. Accordingly, w4 and w5 may be taken as 0. The method for determining the values of w1, w2, and w3 is illustrated by taking w1 as an example: obtaining the R reference compensation points selected at the target position corresponding to the h1; calculating the sum of the distances between the R reference compensation points and the path curve (the distance between reference compensation points supplemented by the initial position in the R reference compensation points and the path curve is regarded as 0), and recording that the sum of the distances is s1, and w1 being negatively related to s1 (for example, w1=1/s1). The reference weight is negatively related to the distance sum, which may make that the training of the error prediction model pays more attention to the prediction accuracy of the reference compensation point far from the target position, so as to avoid the overfitting of the error prediction model.

It should be noted that taking the error of predicting K target position coordinates as an example, the N reference compensation coordinates and their corresponding errors, initial position coordinates, and K target position coordinates are input to the trained error prediction model each time, these data may come from the same device (the motion axis of the industrial robot). For example, to predict the errors of K target position coordinates of device A, N reference compensation coordinates and their corresponding errors, initial position coordinates, and K target position coordinates of device A are input to the trained error prediction model. However, the training samples of the error prediction model include N reference compensation coordinates and their corresponding errors, initial position coordinates, and K target position coordinates, which may come from multiple devices.

In some embodiments, for a specific device (a specific motion axis of an industrial robot), the number of reference compensation points to be measured may be determined based on the output error (or prediction accuracy) of the error prediction model to meet the prediction requirements of the error prediction model.

In some embodiments, the error output by the error prediction model may be negatively related to the number of reference compensation points that have been determined as requiring measurement. Therefore, the number of reference compensation points are increased to reduce the error output by the error prediction model. In some embodiments, the number of reference compensation points to be measured may be determined based on the possible distribution range of the initial position and/or the possible distribution range of the target position. In some embodiments, the possible distribution range of the initial position and/or the possible distribution range of the target position may be positively related to the number of the reference compensation points that have been determined as requiring measurement, for example, the more the number is, the larger the range is.

In some embodiments, based on the possible distribution range of the target position, it may be necessary to make at least several reference compensation points existed around each target position (within the range of distance less than the threshold).

Only as an example: the possible distribution range of the target position that the motion axis of the industrial robot may reach in the actual operation is determined; a reference compensation point may be measured every certain distance within the range, and the reference compensation points may be equidistant and evenly distributed within the possible distribution range of the target position.

Figure 7:
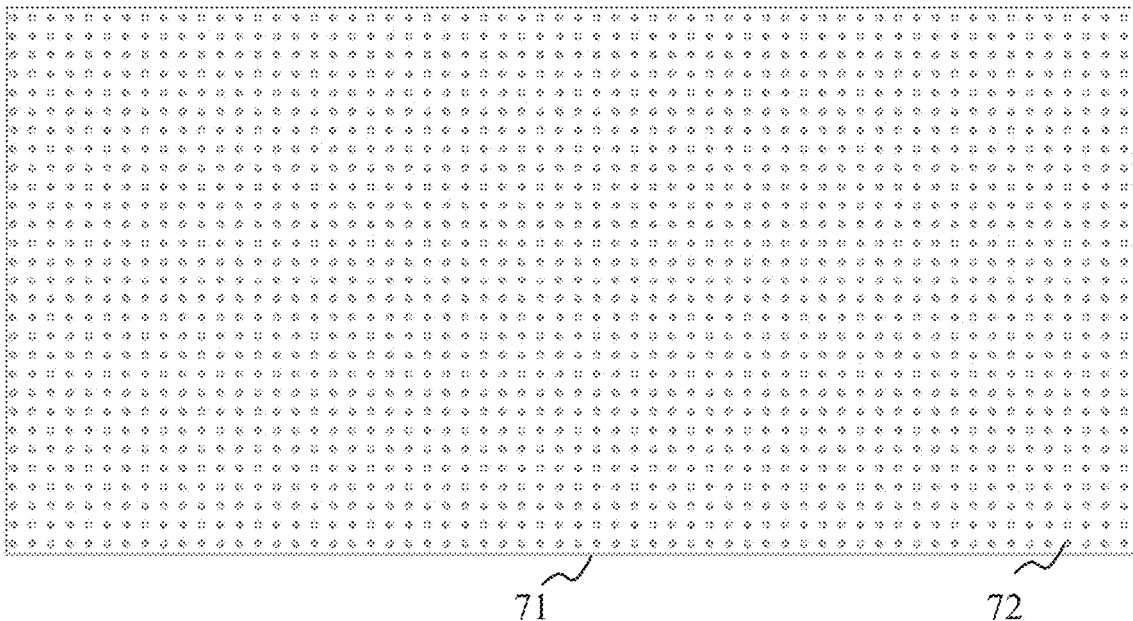
FIG. 7 is a schematic diagram illustrating an exemplary distribution of reference compensation points within a possible distribution range of a target position according to some embodiments of the present disclosure.

FIG. 7 is a schematic diagram illustrating an exemplary distribution of the reference compensation points within a possible distribution range of a target position according to some embodiments of the present disclosure. As shown in FIG. 7, the rectangular frame 71 represents the possible distribution range of the target position, the points 72 represent the reference compensation points, and several reference compensation points 72 may be equidistant and evenly distributed within the possible distribution range 71 of the target position, which may avoid too many reference compensation points around the target location, resulting in redundant measurement and lengthy calculations and may also avoid too few reference compensation points around the target location, resulting in high prediction error of some target locations.

Those skilled in the art may realize that the units and algorithm steps of the examples described in connection with the embodiments disclosed herein may be implemented in electronic hardware, computer software, or a combination of the two. In order to clearly illustrate the interchangeability of hardware and software, the composition and steps of the examples have been generally described in the above description according to functions. The execution of these functions in hardware or software depends on the specific application and design constraints of the technical solution. A professional technician may use different methods to implement the described functions for each specific application, but such implementation should not be considered beyond the scope of the present disclosure.

In the several embodiments provided in the present disclosure, it should be understood that the disclosed devices and methods may be realized in other ways. For example, the device embodiment described above may be only a schematic. For example, the division of the unit may be only a logical function division, and there may be another division mode in actual implementation. For example, multiple units or components may be combined or integrated into another system, or some features can be ignored or not executed. In addition, the mutual coupling or direct coupling, or communication connection shown or discussed may be indirect coupling or communication connection through some interfaces, devices, or units, or maybe electrical, mechanical, or other forms of connection.

The unit described as a separate part may or may not be physically separated. As a unit, those skilled in the art may realize that the unit and algorithm steps of each example described in combination with the embodiments disclosed herein may be realized by electronic hardware, computer software, or a combination of the two. In order to clearly illustrate the interchangeability of hardware and software, in the above description, the composition and steps of each example have been generally described according to the function. These functions are executed in hardware or software, depending on the specific application and design constraints of the technical solution. A professional technician may use different methods to implement the described functions for each specific application, but such implementation should not be considered beyond the scope of the present disclosure.

In addition, each functional unit in each embodiment of the present disclosure may be integrated into one processing unit, or each unit may exist separately, or two or more units may be integrated into one unit. The above integrated units may be realized in the form of hardware or software functional units.

The integrated unit may be stored in a computer-readable storage medium if it is realized in the form of a software functional unit and sold or used as an independent product. Based on this understanding, the technical solution of the present disclosure may be embodied in the form of a software product, which is stored in a storage medium. A plurality of instructions may be included to enable a computer device (which may be a personal computer, a server, a grid device, etc.) to perform all or part of the steps of the method described in the various embodiments of the present invention. The aforementioned storage media include a USB flash disk, a mobile hard disk, a read-only memory (ROM), a random access memory (RAM), a magnetic disc or optical disc, and other media that can store program codes.

The specific embodiments described above further describe the objectives, technical solutions, and beneficial effects of the present disclosure in detail, and it should be understood that the above descriptions are only specific embodiments of the present disclosure, and maybe not be intended to limit the scope of the present disclosure, any modification, equivalent replacement, improvement, etc. made within the spirit and principle of the present disclosure shall be included within the protection scope of the present disclosure.

It should be noted that the contents and related descriptions are shown in FIGS. 1 to 7 may be only for example and explanation and do not limit the scope of the present disclosure. For those skilled in the art, various modifications and changes may be made to the process and structure under the guidance of the present disclosure, such as changing the shape of the possible distribution range of the target position. These modifications and changes are still within the scope of the present disclosure.

It should be noted that different embodiments may produce different beneficial effects. In different embodiments, the possible beneficial effects may be any one or a combination of the above, or any other possible beneficial effects.

The basic concepts have been described above. Obviously, for those skilled in the art, the detailed disclosure above may be only an example and does not constitute a limitation of the present disclosure. Although not explicitly stated here, those skilled in the art may make various modifications, improvements and amendments to the present disclosure. These alterations, improvements, and modifications are intended to be suggested by this disclosure, and within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment may be included in at least one embodiment of the present disclosure. Therefore, it should be emphasized and noted that "one embodiment", "one embodiment" or "an alternative embodiment" mentioned twice or more in different positions in the present disclosure does not necessarily refer to the same embodiment. In addition, some features, structures, or features in the present disclosure of one or more embodiments may be appropriately combined.

In addition, unless expressly stated in the claims, the sequence of processing elements and sequences, the use of numbers and letters, or the use of other names described in the present disclosure may be not used to limit the sequence of the processes and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." Unless otherwise stated, "about", "approximately" or "substantially" indicates that the number is allowed to have a change of ±20%. Accordingly, in some embodiments, the numerical parameters used in the description and claims may be approximate values, and the approximate values may be changed according to the characteristics required by individual embodiments. In some embodiments, the numerical parameter should consider the specified significant digits and adopt the method of general digit reservation. Although in some embodiments of the present disclosure, the numerical domains and parameters used to confirm the range are approximate values, in specific embodiments, the setting of such values may be as accurate as possible within the feasible range.

For each patent, patent application, patent application disclosure, and other materials cited in the present disclosure, such as articles, books, specifications, publications, documents, etc., the entire contents are hereby incorporated into the present disclosure for reference. Except for the present disclosure history documents that are inconsistent with or conflict with the content of the present, and the documents that limit the widest range of claims of the present disclosure (currently or later appended to the present disclosure). It should be noted that in case of any inconsistency or conflict between the description, definitions, and/or use of terms in the attached materials of the present disclosure and the contents described in the present, the description, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An Industrial Internet of Things for repeated positioning accuracy regulation, comprising:
    a user platform, a service platform, a management platform, a sensor network platform, and an object platform that interact in turn, wherein
    the sensor network platform and the service platform adopt a centralized arrangement, and the management platform adopts a front sub-platform arrangement, wherein
        the centralized arrangement refers to that the sensor network platform or the service platform uniformly receives data, uniformly processes data, and uniformly sends data; and
        the front sub-platform arrangement refers to the management platform being provided with a general platform and a plurality of sub-platforms, the plurality of sub-platforms store and process data of different types or different receiving objects sent by a lower-level platform, respectively, and the general platform stores and processes the data from the plurality of sub-platforms after summarizing, and transmits the data to an upper platform;
    the object platform at least includes an industrial robot on a production line and a repeated positioning accuracy measuring device configured for the industrial robot;
    when sending a repeated positioning accuracy measurement instruction, the service platform generates a first instruction and sends the first instruction to the general platform of the management platform;

the general platform of the management platform parses the first instruction to obtain an object platform information contained in the first instruction, and sends the object platform information corresponding to the first instruction to a sub-platform of the corresponding the management platform;

after receiving the first instruction, the sub-platform of the management platform generates a measurement program package for point-by-point positioning accuracy measurement, and generates a second instruction based on the measurement program package and sends it to the sensor network platform;

the sensor network platform receives the second instruction and sends it to a corresponding object platform, the object platform performs the point-by-point positioning accuracy measurement based on the second instruction to obtain a positioning error of each compensation point, and packages and sends it to the sensor network platform;

the sensor network platform receives the positioning error of each compensation point, generates a data packet recognized by the management platform, and sends it to the sub-platform of the management platform;

the sub-platform of the management platform receives the data packet, generates a group of new compensation parameters based on a positioning error data of each compensation point, stores them, and sends them to the sensor network platform; and the sensor network platform sends the new compensation parameters to the corresponding object platform, and the industrial robot of the object platform performs positioning compensation based on the new compensation parameters.

2. The Industrial Internet of Things of claim 1, wherein after receiving the first instruction, the sub-platform of the management platform generates the measurement program package for point-by-point positioning accuracy measurement, including:

pre-storing, by the sub-platform of the management platform, coaxial measurement point data classified according to a motion axis of the industrial robot, and the coaxial measurement point data being used to measure a positioning accuracy in a same motion axis, wherein each of the coaxial measurement point data includes one reference point coordinate information and a plurality of compensation point coordinate information of the industrial robot corresponding to the object platform;

after receiving the first instruction, retrieving the reference point coordinate information and the plurality of compensation points coordinate information in the coaxial measurement point data, and obtaining a plurality of coordinate sets including a starting point coordinate and a ending point coordinate through taking each of the compensation point coordinate information as the starting point coordinate and taking the reference point coordinate information as the ending point coordinate by the sub-platform of the management platform; and integrating the plurality of coordinate sets of the same motion axis and packaging the integrated coordinate sets of the same motion axis and a plurality of coordinate sets of all motion axes to generate the measurement program package.

3. The Industrial Internet of Things of claim 2, wherein the object platform performs point-by-point positioning accuracy measurement based on the second instruction to obtain a positioning error of each compensation point, and packages and sends it to the sensor network platform, including:

performing, by the industrial robot, positioning action of the same motion axis according to the plurality of coordinate sets of the same motion axis in the second instruction after the object platform receives the second instruction, and the repeated positioning accuracy measuring device synchronously measuring and storing; and obtaining actual coordinate of movement of each compensation point, calculating a difference between the actual coordinate of each compensation point and the coordinate of the reference point in the same motion axis, and taking the corresponding difference as the positioning error of each compensation point, packaging and sending it to the sensor network platform.

4. The Industrial Internet of Things of claim 1, wherein the sub-platform of the management platform receives the data packet, generates a group of new compensation parameters according to the positioning error data of each compensation point, stores them, and sends them to the sensor network platform, and the sensor network platform sends the new compensation parameters to the corresponding object platform, and the industrial robot of the object platform performs positioning compensation based on the new compensation parameters, including:

after receiving the data packet, integrating the positioning error data of each compensation point corresponding to each compensation point to form an error compensation table, and sending the error compensation table as a final compensation parameter to the sensor network platform by the sub-platform of the management platform;

after receiving the error compensation table, converting, by the sensor network platform, the error compensation table into a configuration file recognized by the industrial robot of the corresponding object platform; and after receiving the configuration file, overwriting a pre-stored error compensation table in the industrial robot with the error compensation table, and performing the positioning compensation according to the error compensation table by the industrial robot of the object platform.

5. The Industrial Internet of Things of claim 4, further comprising:

when the sub-platform of the management platform pre-stores allowable positioning error value of each compensation point and the pre-stored error compensation table of the corresponding industrial robot, after receiving the data packet and comparing the positioning error data of each compensation point with the allowable positioning error value of each compensation point, the sub-platform of the management platform executing operations including:

in response to a determination that the positioning error data of the compensation point is within the allowable positioning error value of the corresponding compensation point, determining that the compensation point does not need compensation, and taking the compensation parameters of the corresponding compensation point in the pre-stored error compensation table as the compensation parameters of the compensation point; or in response to a determination that the positioning error data of the compensation point is not within the allowable positioning error value of the corresponding compensation point, generating the compensation parameters of the corresponding compensation point based on the integrated error compensation table.

6. The Industrial Internet of Things of claim 1, wherein the repeated positioning accuracy measuring device is a laser interferometer or a laser tracker.

7. A control method of an Industrial Internet of Things for repeated positioning accuracy regulation, the Industrial Internet of Things including a user platform, a service platform, a management platform, a sensor network platform, and an object platform that interact in turn, wherein
the sensor network platform and service platform adopt a centralized arrangement, and
the management platform adopts a front sub-platform arrangement, wherein
the centralized arrangement refers to that the sensor network platform or the service platform uniformly receives data, uniformly processes data, and uniformly sends data; and
the front sub-platform arrangement refers to the management platform being provided with a general platform and a plurality of sub-platforms, the plurality of sub-platforms store and process data of different types or different receiving objects sent by a lower-level platform, respectively, and the general platform stores and processes the data of the plurality of sub-platforms after summarizing, and transmits the data to an upper platform;
the object platform at least includes an industrial robot on a production line and a repeated positioning accuracy measuring device configured for the industrial robot; and
the control method comprises:
when sending a repeated positioning accuracy measurement instruction, generating a first instruction and sending the first instruction to the general platform of the management platform by the service platform;
parsing the first instruction to obtain object platform information contained in the first instruction, and sending the object platform information corresponding to the first instruction to a sub-platform of the corresponding the management platform by the general platform of the management platform;
after receiving the first instruction, generating a measurement program package for point-by-point positioning accuracy measurement, and generating a second instruction based on the measurement program package and sending it to the sensor network platform by the sub-platform of the management platform;
receiving the second instruction and sending it to a corresponding object platform by the sensor network platform, performing the point-by-point positioning accuracy measurement based on the second instruction to obtain a positioning error of each compensation point, and packaging and sending it to the sensor network platform by the object platform;
receiving the positioning error of each compensation point, generating a data packet recognized by the management platform, and sending it to the sub-platform of the management platform by the sensor network platform;
receiving the data packet, generating a group of new compensation parameters based on the positioning error data of each compensation point, storing them, and sending them to the sensor network platform by the sub-platform of the management platform; and
sending the new compensation parameters to the corresponding object platform by the sensor network platform and performing positioning compensation based on the new compensation parameters by the industrial robot of the object platform.

8. The control method of claim 7, wherein after receiving the first instruction, generating the measurement package for point-by-point positioning accuracy measurement by the sub-platform of the management platform, including:
pre-storing, by the sub-platform of the management platform, coaxial measurement point data classified according to a motion axis of the industrial robot, the coaxial measurement point data being used to measure a positioning accuracy in the same motion axis, wherein each of the coaxial measuring point data includes one reference point coordinate information and a plurality of compensation point coordinate information of the industrial robot corresponding to the object platform;
after receiving the first instruction, retrieving the reference point coordinate information and the plurality of compensation points coordinate information in the coaxial measurement point data, obtaining a plurality of coordinate sets including a starting point coordinate and a ending point coordinate through taking each of the compensation point coordinate information as the starting point coordinate and taking the reference point coordinate information as the ending point coordinate by the sub-platform of the management platform; and
integrating the plurality of coordinate sets of the same motion axis and packaging the integrated coordinate sets of the same motion axis and a plurality of coordinate sets of all motion axes to generate the measurement program package.

9. The control method of claim 8, wherein performing point-by-point positioning accuracy measurement based on the second instruction to obtain a positioning error of each compensation point, and packaging and sending it to the sensor network platform by the object platform, including:
performing, by the industrial robot, positioning action of the same motion axis according to the plurality of coordinate sets of the same motion axis in the second instruction after the object platform receives the second instruction, and the repeated positioning accuracy measuring device synchronously measuring and storing; and
obtaining actual coordinates of movement of each compensation point, calculating a difference between the actual coordinate of each compensation point and the coordinate of the reference point in the same motion axis, and taking the corresponding difference as the positioning error of each compensation point, packaging and sending it to the sensor network platform.

10. The control method of claim 7, wherein receiving the data packet, generating a group of new compensation parameters according to the positioning error data of each compensation point, storing them, and sending them to the sensor network platform by the sub-platform of the management platform, and
sending the new compensation parameters to the corresponding object platform by the sensor network platform, and performing positioning compensation based on the new compensation parameters by the industrial robot of the object platform, including:
after receiving the data packet, integrating the positioning error data of each compensation point corresponding to each compensation point to form an error compensation table, and sending the error compensation table as a final compensation parameter to the sensor network platform by the sub-platform of the management platform;

after receiving the error compensation table, converting, by the sensor network platform, the error compensation table into a configuration file recognized by the industrial robot of the corresponding object platform; and after receiving the configuration file, overwriting a pre-stored error compensation table in the industrial robot with the error compensation table, and performing the positioning compensation according to the error compensation table by the industrial robot of the object platform.

11. The control method of claim 10, the method further comprising:

when the sub-platform of the management platform pre-stores allowable positioning error value of each compensation point and the pre-stored error compensation table of the corresponding industrial robot, after receiving the data packet and comparing the positioning error data of each compensation point with the allowable positioning error value of each compensation point, the sub-platform of the management platform executing operations including:

in response to a determination that the positioning error data of the compensation point is within the allowable positioning error value of the corresponding compensation point, determining that the compensation point does not need compensation, and taking the compensation parameters of the corresponding compensation point in the pre-stored error compensation table as the compensation parameters of the compensation point; or in response to a determination that the positioning error data of the compensation point is not within the allowable of the positioning error value of the corresponding compensation point, generating the compensation parameters of the corresponding compensation point based on the integrated error compensation table.

12. The control method of claim 7, wherein the repeated positioning accuracy measuring device is a laser interferometer or a laser tracker.

13. A non-transitory computer-readable storage medium storing computer instructions, wherein when executing the instruction by a processor, a computer realizes the control method of the Industrial Internet of Things for repeated positioning accuracy regulation of claim 7.

* * * * *